United States Patent
Meano et al.

(10) Patent No.: US 10,125,725 B2
(45) Date of Patent: Nov. 13, 2018

(54) TURBOCHARGED AUTOMOTIVE SYSTEM

(71) Applicant: GM GLOBAL TECHNOLOGY OPERATIONS LLC, Detroit, MI (US)

(72) Inventors: Cesare Maria Meano, Turin (IT); Alberto Racca, Cavallermaggiore (IT); Joaquin De La Morena, Valencia (ES)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 0 days.

(21) Appl. No.: 15/413,085

(22) Filed: Jan. 23, 2017

(65) Prior Publication Data

US 2017/0211521 A1 Jul. 27, 2017

(30) Foreign Application Priority Data

Jan. 21, 2016 (GB) .................... 1601212.2

(51) Int. Cl.

| F02M 26/32 | (2016.01) |
|---|---|
| F02M 26/33 | (2016.01) |
| F02M 26/04 | (2016.01) |
| F01P 3/20 | (2006.01) |
| F01P 7/16 | (2006.01) |
| F02B 29/04 | (2006.01) |
| F02D 41/26 | (2006.01) |
| F01P 7/14 | (2006.01) |

(52) U.S. Cl.
CPC .............. *F02M 26/33* (2016.02); *F01P 3/20* (2013.01); *F01P 7/16* (2013.01); *F02B 29/0462* (2013.01); *F02D 41/26* (2013.01); *F02M 26/04* (2016.02); *F01P 2007/146* (2013.01); *F01P 2025/32* (2013.01)

(58) Field of Classification Search
CPC . F02M 26/33; F02M 26/04; F01P 3/20; F01P 7/16; F01P 2007/146; F02B 29/0462; F02D 41/26
USPC ................. 123/568.12, 562, 563, 559.1
See application file for complete search history.

(56) References Cited

U.S. PATENT DOCUMENTS

| 2014/0150758 A1 | 6/2014 | Zurlo et al. |
| 2015/0128587 A1* | 5/2015 | Dane ............ F02M 45/02 60/605.2 |

FOREIGN PATENT DOCUMENTS

| GB | 2473821 A | 3/2011 |
| GB | 2502833 A | 12/2013 |
| JP | H11311114 A | 11/1999 |
| JP | 2010053732 A * | 3/2010 |

OTHER PUBLICATIONS

Great Britain Patent Office, Great Britain Search Report for Great Britain Application No. 1601212.2, dated Jun. 30, 2016.

* cited by examiner

*Primary Examiner* — Mahmoud Gimie
(74) *Attorney, Agent, or Firm* — Lorenz & Kopf, LLP

(57) ABSTRACT

A turbocharged automotive system includes an internal combustion engine and a Long Route Exhaust Gas Recirculation system connected to an exhaust line of the engine. The LR-EGR system is equipped with a LR-EGR cooler, which is cooled by a LR-EGR coolant circuit receiving coolant from an engine coolant circuit. The turbocharged automotive system further includes a low temperature coolant circuit and a connecting element for connecting the LR-EGR coolant circuit with the low temperature coolant circuit bypassing the engine coolant circuit.

7 Claims, 4 Drawing Sheets

700 - sensing exhaust gas outlet temperature $T_{gas,out}$

710 - is $T_{gas,out}$ greater than $T_{gas,out\,THR}$ ?

720 - disconnect LR-EGR coolant circuit from engine coolant circuit

730 - connect LR-EGR coolant circuit to low temperature coolant circuit

740 - disconnect LR-EGR coolant circuit from low temperature coolant circuit

750 - connect LR-EGR coolant circuit to engine coolant circuit

TURBOCHARGED AUTOMOTIVE SYSTEM

CROSS-REFERENCE TO RELATED APPLICATION

This application claims priority to Great Britain Patent Application No. 1601212.2, filed Jan. 21, 2016, which is incorporated herein by reference in its entirety.

TECHNICAL FIELD

The present disclosure pertains to a turbocharged automotive system.

BACKGROUND

Current turbocharged automotive systems may be equipped with a Long Route (or Low Pressure) Exhaust Gas Recirculation (LR-EGR) system that defines an exhaust gas long route including a relevant portion of the exhaust line and connecting it to a relevant portion of the intake line. In such automotive systems, it is known that the simultaneous extension of the Long Route (or Low Pressure) Exhaust Gas Recirculation (LR-EGR) system usage either at high engine loads or at low engine temperatures poses contradictory requirements on the LR-EGR cooler design.

On one hand, the efficiency of the cooler needs to be low enough to allow a sufficiently early activation of the LR EGR system during engine warmup without incurring in water condensation inside the cooler (e.g., the gas temperature should be maintained above the corresponding dew temperature, for example T>55° C.). On the other hand, the efficiency of the cooler must be high enough when the LR EGR is operated at high engine loads to allow an acceptable Compressor Out Temperature (COT). In other words, during engine warmup when the engine is still cold, there is a risk of condensation in the LR-EGR cooler, while at high engine loads, the Compressor Out Temperature (COT) may increase over the maximum allowable temperature.

Accordingly, there is a need in the art to provide an automotive system that safely extends the usage of the LR-EGR system both for cold engine conditions and for high engine loads.

SUMMARY

An embodiment of the disclosure provides a turbocharged automotive system including an internal combustion engine and a Long Route Exhaust Gas Recirculation (LR-EGR) system connected to an exhaust line of the engine. The LR-EGR system is equipped with a LR-EGR cooler, which is cooled by a LR-EGR coolant circuit receiving coolant from an engine coolant circuit. The turbocharged automotive system further includes a low temperature coolant circuit and a connecting element for connecting the LR-EGR coolant circuit with the low temperature coolant circuit bypassing the engine coolant circuit. An advantage of this embodiment is that it allows to use the Long Route Exhaust Gas Recirculation (LR-EGR) system earlier with respect to the prior art during engine warmup and to extend the use of the LR EGR system across higher engine loads, avoiding overheating of the compressor.

According to an embodiment of the present disclosure, the connecting element includes a switch valve. An advantage of this embodiment is that it allows a convenient system to switch from a higher temperature coolant coining from the engine to a lower temperature coolant coming from another cooling circuit, and vice versa. Other high temperature or low temperature circuits may be used without departing from the scope of the various embodiments of the present disclosure.

According to an embodiment of the present disclosure, the switch valve includes a bimetallic element operated as a function of an exhaust gas temperature in a LR-EGR gas outlet pipe. An advantage of this embodiment is that of providing a simple construction of the switch valve.

According to still another embodiment of the present disclosure, the switch valve is operated as a function of an exhaust gas temperature in a LR-EGR gas outlet pipe measured by a temperature sensor. An advantage of this embodiment is that of providing an active switch valve.

According to a further embodiment of the present disclosure, the switch valve is operated under command from an Electronic Control Unit of the engine as a function of an exhaust gas temperature in a LR-EGR gas outlet pipe measured by a temperature sensor. An advantage of this embodiment is that the switch valve can be operated under control of a software stored in a data carrier associated with the ECU.

According to another embodiment of the present disclosure, the speed of actuation of the connecting element is a function of an exhaust gas temperature and/or its derivative in a LR-EGR gas outlet pipe. An advantage of this embodiment is that the actuation speed of the connecting element can be chosen according to the circumstances, namely fast transients may require a fast switch between circuits to avoid a too high exhaust gas temperature in a LR-EGR gas outlet pipe. Otherwise, a slow switch of the connecting element allows a less steep temperature change.

According to another embodiment of the present disclosure, the low temperature circuit receives the coolant from a Water-cooled Charge Air Cooler (WCAC) cooling circuit of the automotive system. An advantage of this embodiment is that the Water-cooled Charge Air Cooler (WCAC) circuit may contain coolant at a relatively low temperature (e.g. 50° C.).

Another embodiment of the present disclosure provides a method of operating a turbocharged automotive system. An exhaust gas temperature is sensed in a LR-EGR gas outlet pipe. A connecting element is operated as a function of the sensed exhaust gas temperature. An advantage of this embodiment is that it allows to use the Long Route (or Low Pressure) Exhaust Gas Recirculation (LR-EGR) system earlier than the prior art during engine warmup and also to extend the use of the LR EGR system across higher engine loads, avoiding overheating of the compressor.

In another embodiment of the present disclosure, an exhaust gas temperature is sensed in a LR-EGR gas outlet pipe. A connecting element is operated for disconnecting the LR-EGR coolant circuit from the engine coolant circuit and connecting the LR-EGR coolant circuit with the low temperature coolant circuit when the sensed exhaust gas temperature is greater than a predefined exhaust gas temperature.

In still another embodiment of the present disclosure, the connecting element is operated for disconnecting the LR-EGR coolant circuit from the low temperature coolant circuit and for connecting the LR-EGR coolant circuit with the engine coolant circuit, if the sensed exhaust gas temperature is lower than a predefined exhaust gas temperature.

In another aspect of the present disclosure, an apparatus for operating a turbocharged automotive system is provided. The apparatus is configured to sense an exhaust gas temperature in a LR-EGR gas outlet pipe, to disconnect the LR-EGR coolant circuit from the engine coolant circuit and to connect the LR-EGR coolant circuit with the low temperature coolant circuit when the sensed exhaust gas temperature is greater than a predefined exhaust gas temperature.

An advantage of this aspect is that it allows to use the Long Route (or Low Pressure) Exhaust Gas Recirculation (LR-EGR) system earlier than the prior art during engine warmup and, at the same time, to extend the use of the LR EGR system across higher engine loads, avoiding overheating of the compressor.

BRIEF DESCRIPTION OF THE DRAWINGS

The present disclosure will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

Figure 1:
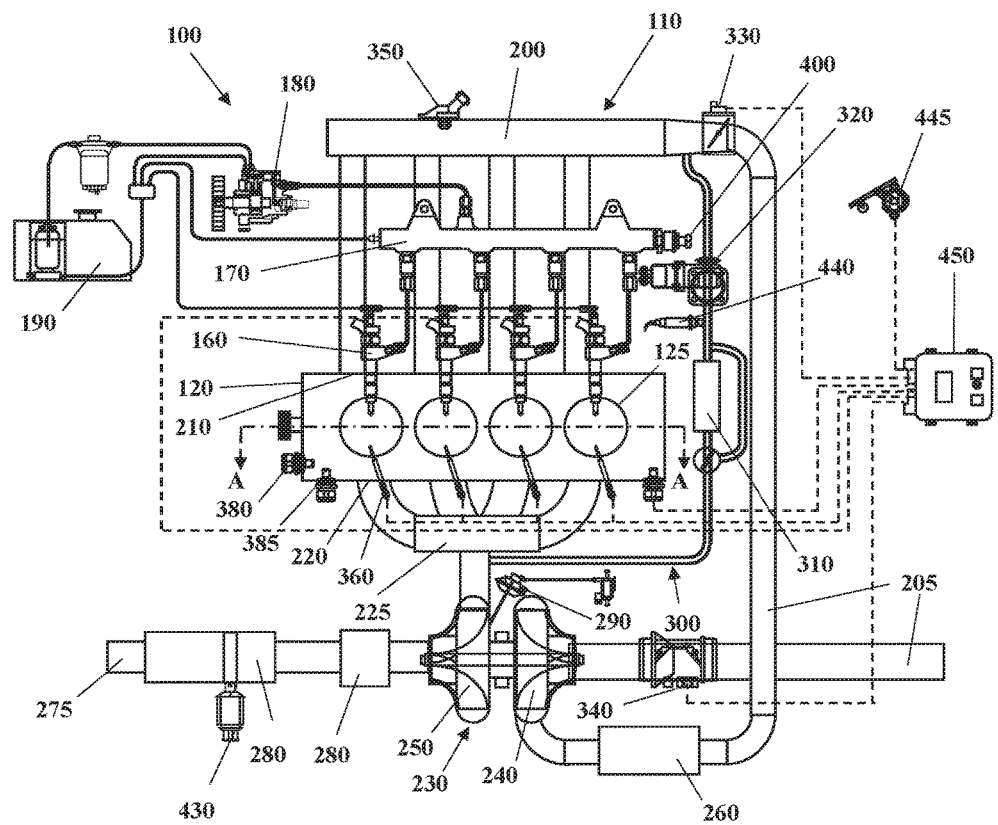
FIG. 1 shows an automotive system.
Figure 2:
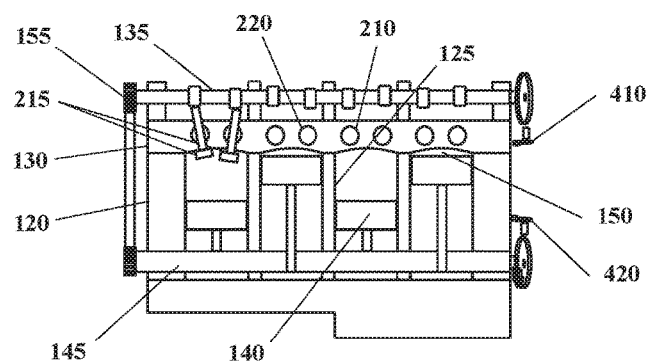
FIG. 2 is a cross-section of an internal combustion engine belonging to the automotive system of FIG. 1.

Some embodiments may include an automotive system 100, as shown in FIGS. 1 and 2, that includes an internal combustion engine (ICE) 110 having an engine block 120 defining at least one cylinder 125 having a piston 140 coupled to rotate a crankshaft 145. A cylinder head 130 cooperates with the piston 140 to define a combustion chamber 150. A fuel and air mixture (not shown) is disposed in the combustion chamber 150 and ignited, resulting in hot expanding exhaust gasses causing reciprocal movement of the piston 140. The fuel is provided by at least one fuel injector 160 and the air through at least one intake port 210. The fuel is provided at high pressure to the fuel injector 160 from a fuel rail 170 in fluid communication with a high-pressure fuel pump 180 that increases the pressure of the fuel received from a fuel source 190.

Each of the cylinders 125 has at least two valves 215, actuated by a camshaft 135 rotating in time with the crankshaft 145. The valves 215 selectively allow air into the combustion chamber 150 from the port 210 and alternately allow exhaust gases to exit through a port 220. In some examples, a cam phaser 155 may selectively vary the timing between the camshaft 135 and the crankshaft 145. The air may be distributed to the air intake port(s) 210 through an intake manifold 200. An air intake duct 205 may provide air from the ambient environment to the intake manifold 200. In other embodiments, a throttle body 330 may be provided to regulate the flow of air into the manifold 200.

In still other embodiments, a forced air system such as a turbocharger 230, having a compressor 240 rotationally coupled to a turbine 250, may be provided. Rotation of the compressor 240 increases the pressure and temperature of the air in the duct 205 and manifold 200. A Water-cooled Charge Air Cooler (WCAC) 260 disposed in the duct 205 may reduce the temperature of the air. The turbine 250 rotates by receiving exhaust gases from an exhaust manifold 225 that directs exhaust gases from the exhaust ports 220 and through a series of vanes prior to expansion through the turbine 250. The exhaust gases exit the turbine 250 and are directed into an exhaust system 270. This example shows a variable geometry turbine (VGT) with a VGT actuator 290 arranged to move a rack of vanes 295 in different positions, namely from a fully closed position to a fully open position, to alter the flow of the exhaust gases through the turbine 250. In other embodiments, the turbocharger 230 may be fixed geometry and/or include a waste gate.

The exhaust system 270 may include an exhaust pipe 275 having one or more exhaust aftertreatment devices 280. The aftertreatment devices may be any device configured to change the composition of the exhaust gases. Some examples of aftertreatment devices 280 include, but are not limited to, catalytic converters (two and three way), oxidation catalysts, lean $NO_x$ traps, hydrocarbon adsorbers, selective catalytic reduction (SCR) systems, and particulate filters.

Other embodiments may include an exhaust gas recirculation (EGR) system 300 coupled between the exhaust manifold 225 and the intake manifold 200. The EGR system 300 may include an EGR cooler 310 to reduce the temperature of the exhaust gases in the EGR system 300. An EGR valve 320 regulates a flow of exhaust gases in the EGR system 300.

While the first EGR conduit defines a short route for the exhaust gas recirculation, in accordance with the present disclosure, a second EGR system 505 (better detailed in FIG. 3) that fluidly connects the exhaust line downstream of the aftertreatment systems to the intake line upstream the intake manifold and is connected therein by the interposition of T-joint integrating a three-way valve, may be provided.

Figure 4:
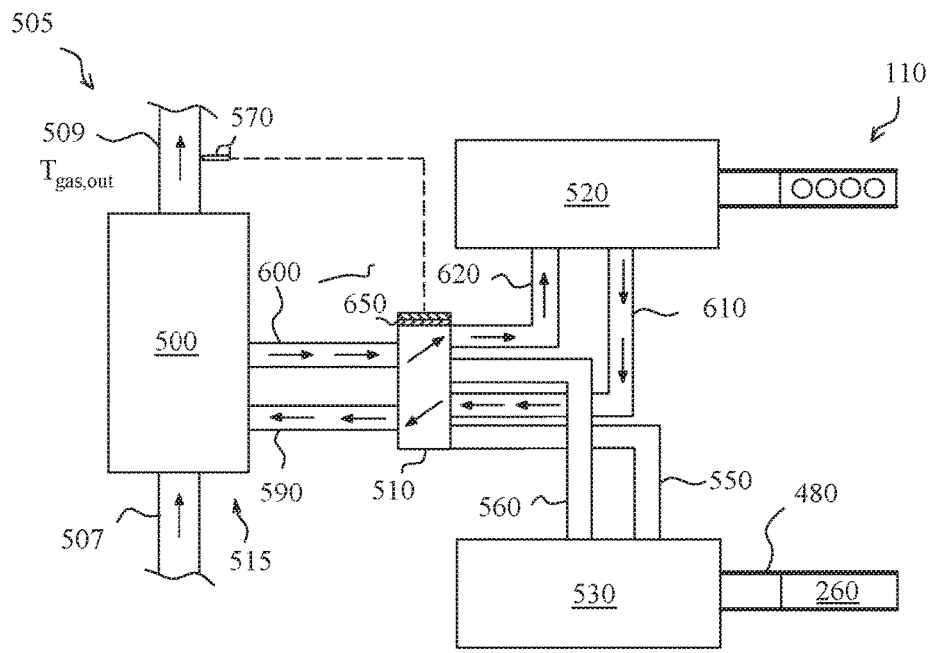
FIG. 4 shows a first operating condition of the LR-EGR cooler.
Figure 5:
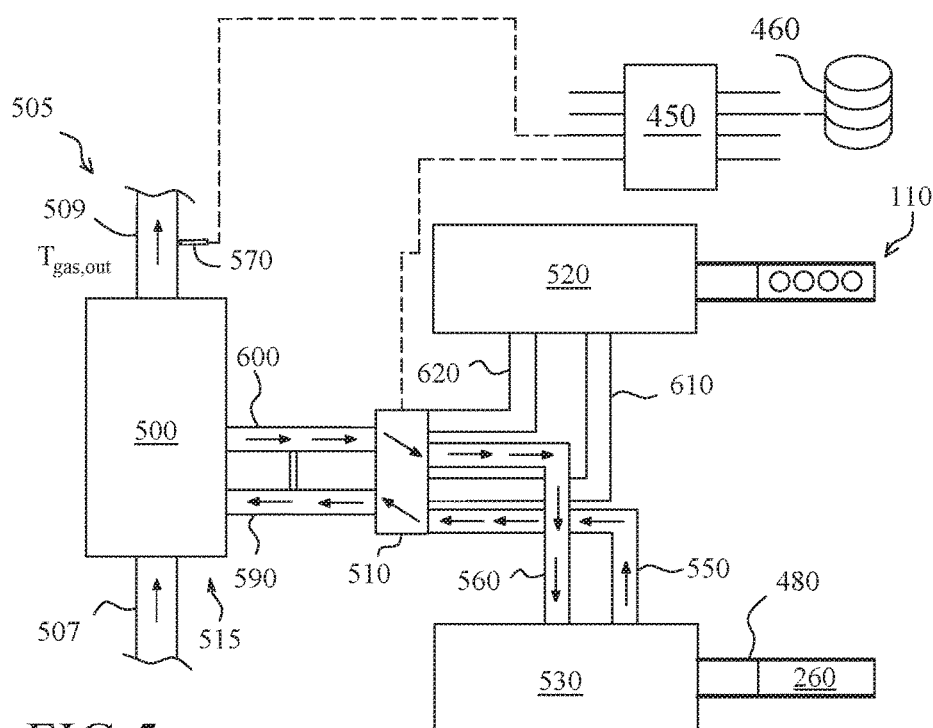
FIG. 5 shows a second operating condition of the LR-EGR cooler.

In an alternative embodiment, instead of a three-way valve, a valve on the exhaust line after the T-joint downstream of a Diesel particulate filter can be used instead of the valve 640. The valve 630 stays in this case as a "single" valve. The second EGR system 505 defines a long route which includes also a relevant portion of the exhaust line and a relevant portion of the intake line and is provided with a cooler 500. A portion of such second EGR system 505, or LR-EGR system, is shown in FIGS. 4-5 better described hereinafter.

The automotive system 100 may further include an electronic control unit (ECU) 450 in communication with one or more sensors and/or devices associated with the ICE 110 and with a memory system and an interface bus. The ECU 450 may receive input signals from various sensors configured to generate the signals in proportion to various physical parameters associated with the ICE 110. The sensors include, but are not limited to, a mass airflow and temperature sensor 340, a manifold pressure and temperature sensor 350, a combustion pressure sensor that may be integral within glow plugs 360, a coolant temperature sensor 380, an oil temperature sensor 385 and respective levels sensors, a fuel rail pressure sensor 400, a can position sensor 410, a crank position sensor 420, exhaust pressure and temperature sensors 430, an EGR temperature sensor 440, and an accelerator pedal position sensor 445. Furthermore, the ECU 450 may generate output signals to various control devices that are arranged to control the operation of the ICE 110, including, but not limited to, the fuel injectors 160, the throttle body 330, the EGR Valve 320, a Variable Geometry Turbine (VGT) actuator 290, and the cam phaser 155. Note, dashed lines are used to indicate communication between the ECU 450 and the various sensors and devices, but some are omitted for clarity.

Turning now to the ECU 450, this apparatus may include a digital central processing unit (CPU) in communication with a memory system, or data carrier 460, and an interface bus. The CPU is configured to execute instructions stored as a program in the memory system, and send and receive signals to/from the interface bus. The memory system may include various storage types including optical storage, magnetic storage, solid state storage, and other non-volatile memory. The interface bus may be configured to send, receive, and modulate analog and/or digital signals to/from the various sensors and control devices. The program may embody the methods disclosed herein, allowing the CPU to carry out the steps of such methods and control the ICE 110.

The program stored in the memory system is transmitted from outside via a cable or in a wireless fashion. Outside the automotive system 100 it is normally visible as a computer program product, which is also called computer readable medium or machine readable medium in the art, and which should be understood to be a computer program code residing on a carrier, said carrier being transitory or non-transitory in nature with the consequence that the computer program product can be regarded to be transitory or non-transitory in nature.

An example of a transitory computer program product is a signal, e.g. an electromagnetic signal such as an optical signal, which is a transitory carrier for the computer program code. Carrying such computer program code can be achieved by modulating the signal by a conventional modulation technique such as QPSK for digital data, such that binary data representing said computer program code is impressed on the transitory electromagnetic signal. Such signals are e.g. made use of when transmitting computer program code in a wireless fashion via a Wi-Fi connection to a laptop.

In case of a non-transitory computer program product the computer program code is embodied in a tangible storage medium. The storage medium is then the non-transitory carrier mentioned above, such that the computer program code is permanently or non-permanently stored in a retrievable way in or on this storage medium. The storage medium can be of a conventional type known in computer technology such as a flash memory, an Asic, a CD or the like.

Instead of an ECU 450, the automotive system 100 may have a different type of processor to provide the electronic logic, e.g. an embedded controller, an onboard computer, or any processing module that might be deployed in the vehicle.

Figure 3:
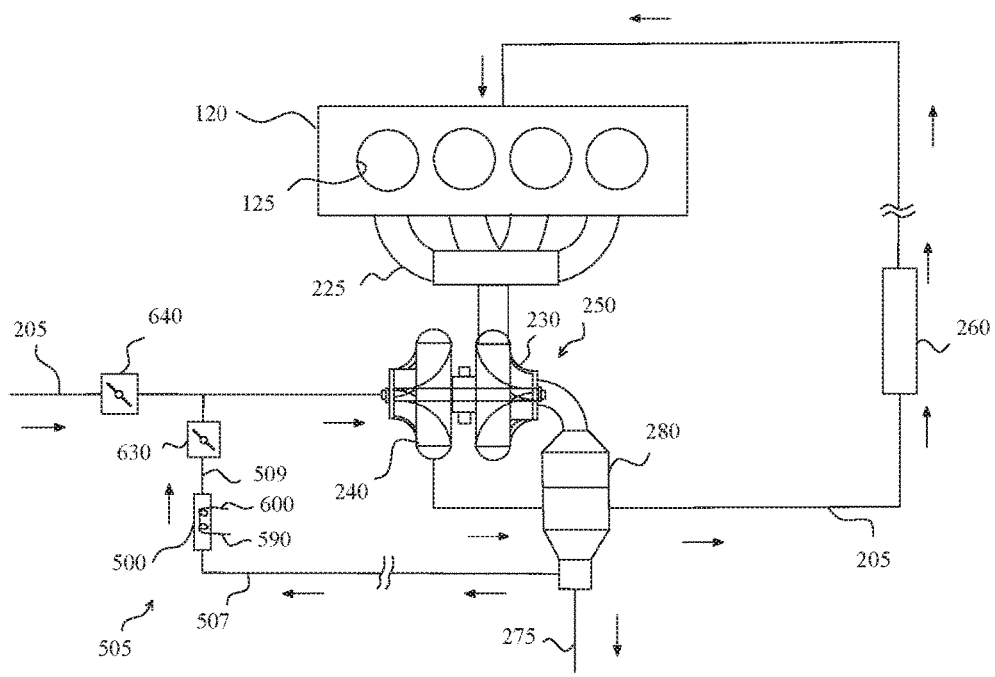
FIG. 3 shows a portion of the automotive system of FIG. 1, according to an embodiment of the present disclosure.

As stated above, the automotive system 100 may be equipped with a Long Route (or Low Pressure) Exhaust Gas Recirculation (LR-EGR) system 505, including a LR-EGR cooler 500, the LR-EGR system 505 defining an exhaust gas long route that includes a relevant portion of the exhaust line 275 and being connected to a relevant portion of the intake line downstream of the air intake duct 205, as shown in FIG. 3 that shows, in better detail, a portion of the automotive system of FIG. 1.

Downstream of the long route EGR cooler 500, an EGR valve 630 is provided to regulate the flow of EGR gases into the air intake duct 205, while downstream of an air filter (not represented for simplicity), an air intake valve 640 may be provided.

In general, the efficiency of the LR-EGR cooler 500 can be defined, among others, as follows:

$$\eta = \frac{T_{gas,in} - T_{gas,out}}{T_{gas,in} - T_{coolant,in}} \quad (1)$$

where $T_{gas,in}$ is the temperature of the exhaust gas at the inlet of the LR-EGR cooler 500;

$T_{gas,out}$ is the temperature of the exhaust gas at the outlet of the LR-EGR cooler 500; and $T_{coolant,in}$ the temperature of the LR-EGR cooler coolant at the inlet of the LR-EGR cooler.

The above Equation (1) is valid only if:

$$\dot{m}_{cool} c_{p,cool} > \dot{m}_{gas} c_{p,gas}$$

where:

$\dot{m}_{cool}$ is the coolant mass flow;

$c_{p,cool}$ is the heat capacity (at constant pressure) of the coolant;

$\dot{m}_{gas}$ is the exhaust gas mass flow; and $c_{p,gas}$ is the heat capacity (at constant pressure) of the exhaust gas.

In this context, high efficiency of the LR-EGR cooler 500 means that the exhaust gas temperature at the LR-EGR cooler outlet $T_{gas,out}$ is almost the same of the coolant temperature at the LR-EGR cooler inlet $T_{coolant,in}$, namely $\eta \sim 1$, while low efficiency of the LR-EGR cooler 500 means that the exhaust gas temperature at the LR-EGR cooler outlet $T_{gas,out}$ is significantly greater than the coolant temperature at the LR-EGR cooler inlet $T_{coolant,in}$.

FIG. 4 shows a first operating condition of the LR-EGR cooler 500 during a warm up phase of the engine 110, The LR-EGR cooler 500 includes an inlet pipe 507 that connects the LR-EGR cooler 500 to the exhaust line 275 of the automotive system 100 and an outlet pipe 509 that connects the LR-EGR system 505 with the air intake line 205 of the automotive system. The exhaust gas enters the LR-EGR cooler 500 from the inlet pipe 507 and leaves the LR-EGR cooler 500 from the outlet pipe 509.

The LR-EGR cooler 500 further includes a LR-EGR cooling circuit 515, the LR-EGR cooling circuit 515 being provided with a LR-EGR coolant circuit inlet pipe 590 and with a LR-EGR coolant outlet pipe 600. In this case, the LR-EGR cooler 500 is fed by an engine coolant circuit 520 that provides the coolant. The coolant present in the engine coolant circuit 520 is relatively warm. The coolant exits the engine coolant circuit 520 through a high temperature inlet pipe 610, passes through a switch valve 510, better described hereinafter, and by effect of the valve 510 reaches the LR-EGR cooler 500 through a LR-EGR coolant inlet pipe 590.

The exhaust gas coming from the exhaust line, passes throughout the LR-EGR cooler 500 and it is cooled down from the exhaust gas temperature at the LR-EGR cooler inlet $T_{gas,in}$ to the exhaust gas temperature at the LR-EGR cooler outlet $T_{gas,out}$. After having cooled the exhaust gas in the LR-EGR cooler 500, the coolant returns towards the engine coolant circuit 520 passing through a LR-EGR coolant outlet pipe 600, the switch valve 510 and, by effect of the position of the valve 510, through a high temperature outlet pipe 620.

During warmup, the switch valve 510 guarantees the opening of the cross-section areas of the high temperature inlet pipe 610 and of the high temperature outlet pipe 620 and assures their coupling with the LR-EGR coolant inlet pipe 590 and with the LR-EGR coolant outlet pipe 600 respectively. At the same time the switch valve 510 closes the cross-section areas of a low temperature inlet pipe 550 and of a low temperature outlet pipe 560 of a low temperature circuit 530. In such a way, the coolant present in the engine coolant circuit 520 can feed the LR-EGR cooler 500 and the coolant of the low temperature circuit 530 cannot reach the LR-EGR cooler 500.

If the LR EGR cooler 500 is designed with a relatively low efficiency $\square_1$, because of a relatively high temperature $T_{coolant,\ in}$ guaranteed by the high temperature circuit 520, the exhaust gas temperature at the LR EGR cooler outlet $T_{gas,\ out}$ is high enough so to minimize the risk of condensation downstream of the LR EGR cooler 500. This allows an early usage of LR EGR system 505 during warmup.

FIG. 5 shows a second operating condition of the LR-EGR cooler 500, namely in a high load condition of the engine 110. At high engine loads, the LR-EGR cooler 500 is fed by the low temperature circuit 530 that provides the coolant. The coolant present in the low temperature circuit 530 is relatively cold so that, even if the LR-EGR cooler 500 is designed with a relatively low efficiency, the exhaust gas temperature at the LR EGR cooler outlet $T_{gas,\ out}$ is still low enough not to hit the maximum Compressor Out Temperature. The coolant present in the low temperature circuit 530 may be taken, for example, from a Water-cooled Charge Air Cooler (WCAC) 260 coolant circuit 480. In this case, the switch valve 510 is operated to assume a different configuration with respect to the case described with reference to FIG. 4, so that the coolant exiting the low temperature circuit 530 through the low temperature inlet pipe 550, passes through the switch valve 510, and reaches the LR-EGR cooler 500 through the LR-EGR coolant inlet pipe 590.

After having cooled the exhaust gas in the LR-EGR cooler 500, the coolant comes back towards the low temperature circuit 530 passing first through the LR-EGR coolant outlet pipe 600 then through the switch valve 510 and finally through the low temperature outlet pipe 560. As stated before, at high loads, the switch valve 510 guarantees the opening of the cross-section areas of the low temperature inlet pipe 550 and of the low temperature outlet pipe 560 and assures their coupling with the LR-EGR coolant inlet pipe 590 and with the LR-EGR coolant outlet pipe 600 respectively.

At the same time the switch valve 510 closes the cross-section areas of the high temperature inlet pipe 610 and of the high temperature outlet pipe 620 of the engine coolant circuit 520. In such a way, the coolant present in the low temperature circuit 530 can feed the LR-EGR cooler 500 and the coolant of the engine coolant circuit cannot reach the LR-EGR cooler 500.

In general, the switch valve 510 allows to select the coolant circuit feeding the LR-EGR cooler 500 in order to select the coolant temperature requested on the operating condition of the engine. The switch valve configuration described in FIG. 4 causes the cooler to operate with the hotter coolant while the switch valve configuration described in FIG. 5 causes the cooler to operate with the colder coolant. The switch valve 510 may be either passive or active.

In case of a passive switch valve 510 the activation mechanism may be determined by the material properties of the valve itself, for example by means of a bimetallic valve including a bimetallic element 650 that changes its configuration depending on the temperature, in this case the exhaust gas temperature $T_{gas,out}$ in the LR-EGR gas outlet pipe 509. In case of an active switch valve 510, the activation mechanism may be regulated as a function of the exhaust gas temperature at the LR-EGR cooler outlet $T_{gas,out}$ or may be controlled by the ECU 450.

The exhaust gas temperature at the LR-EGR cooler outlet $T_{gas,out}$ may be detected by a temperature sensor 570 placed at the outlet of the LR-EGR cooler 500. The value of the exhaust gas temperature at the LR-EGR cooler outlet $T_{gas,out}$ measured by the temperature sensor 570 may be fed to the ECU 450 and the ECU 450 may command the valve 510 as a function of such value. The speed of actuation of the valve 510 may be chosen depending on the exhaust gas temperature (and/or its derivative) at the LR-EGR cooler outlet $T_{gas,out}$.

In another embodiment of the present disclosure, the balance between the two circuits may be obtained by sealing and setting under pressure the low temperature circuit 530 and the engine coolant circuit 520. The coolant, due to its incompressibility under pressure, spreads uniformly in the two circuits 520, 530.

Figure 6:
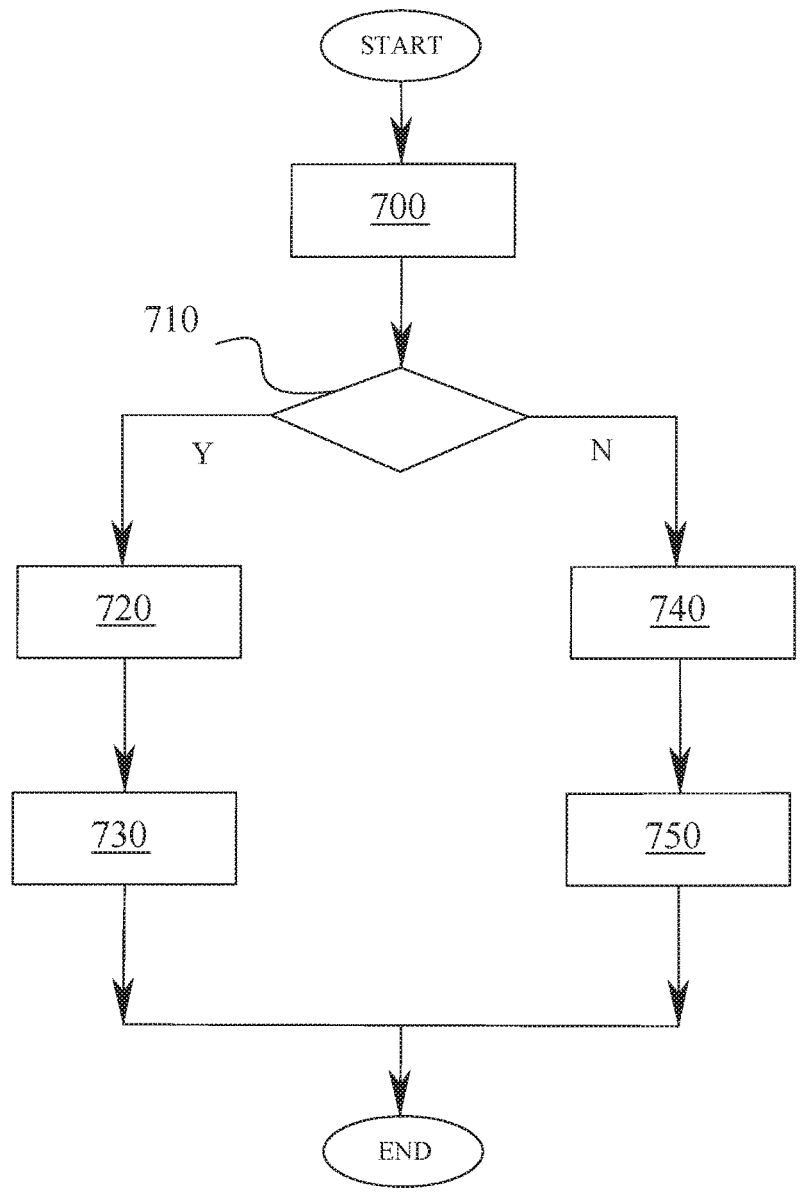
FIG. 6 shows a flowchart of an embodiment of the present disclosure.

FIG. 6 shows a flowchart of an embodiment of the present disclosure. A first step of the method of operating a turbocharged automotive system 100 according to an embodiment of the present disclosure provides for sensing the exhaust gas temperature $T_{gas,out}$ in the LR-EGR gas outlet pipe 509 (block 700). Then a comparison is made between the sensed exhaust gas temperature $T_{gas,out}$ and a predefined exhaust gas temperature $T_{gas,outTHR}$, (block 710).

If the sensed exhaust gas temperature $T_{gas,out}$ is greater than a predefined exhaust gas temperature $T_{gas,outTHR}$, the LR-EGR coolant circuit 515 is disconnected from the engine coolant circuit 520 (block 720), and the LR-EGR coolant circuit 515 is connected with the low temperature coolant circuit 530 (block 730). On the contrary, if the sensed exhaust gas temperature $T_{gas,out}$ is lower than the predefined exhaust gas temperature $T_{gas,outTHR}$, the LR-EGR coolant circuit 515 is disconnected from the low temperature coolant circuit 530 (block 740) and is connected with the engine coolant circuit 520 (block 750).

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A turbocharged automotive system for an internal combustion engine having an inlet duct, an exhaust pipe and an engine cooling circuit, the system comprising:
  a long route exhaust gas recirculation (LR-EGR) system having a recirculation line for exhaust gases from the internal combustion engine, the recirculation line including a first inlet pipe in fluid communication with the exhaust pipe and a first outlet pipe in fluid with the inlet duct, a LR-EGR cooler in fluid communication with the recirculation line between the first inlet pipe and the first outlet pipe, and a cooling circuit thermally coupled with the LR-EGR cooler and having a second inlet pipe and a second outlet pipe;

an engine coolant circuit for circulating a high temperature fluid from a high temperature outlet through the cooling circuit to a high temperature inlet;

a low temperature coolant circuit for circulating a low temperature fluid from a low temperature outlet through the cooling circuit and to a low temperature inlet; and a switch valve selectively coupling the high temperature outlet and the low temperature outlet with the second inlet and selectively coupling the second outlet with the high temperature inlet and the low temperature inlet;

wherein the switch valve is operable in an engine warm-up state for opening the high temperature outlet and the high temperature inlet and closing the low temperature outlet and the low temperature inlet such that fluid communication is provided exclusively between the engine coolant circuit and the cooling circuit for transferring heat between the exhaust gas and the high temperature fluid; and wherein the switch valve is operable in an engine load state for opening the low temperature outlet and low temperature inlet and closing the high temperature outlet and the high temperature inlet such that fluid communication is provided exclusively between the low temperature coolant circuit and the cooling circuit for transferring heat between the exhaust gas and the low temperature fluid.

2. The automotive system according to claim 1, wherein the switch valve comprises a bimetallic element operable as a function of an exhaust gas temperature in the first outlet pipe.

3. The automotive system according to claim 1, further comprising a temperature sensor for measuring an exhaust gas temperature in the first outlet pipe, wherein the switch valve is configured to operate as a function of the measured exhaust gas temperature.

4. The automotive system according to claim 3, further comprising an electronic control unit configured to operate the switch valve as a function of the measured exhaust gas temperature.

5. The automotive system according to claim 1, wherein the switch valve is operable at a speed of actuation, which is a function of an exhaust gas temperature in the first outlet pipe.

6. The automotive system according to claim 5, wherein the function is a derivative of the exhaust gas temperature.

7. The automotive system according to claim 1, further comprising a Water-cooled Charge Air Cooler, wherein the low temperature cooling circuit receives the low temperature fluid from the Water-cooled Charge Air Cooler.

* * * * *